(12) United States Patent
Kanno

(10) Patent No.: US 6,525,508 B1
(45) Date of Patent: Feb. 25, 2003

(54) CHARGING SYSTEM FOR WATERCRAFT

(75) Inventor: Isao Kanno, Shizuoka (JP)

(73) Assignee: Sanshin Kogyo Kabushiki Kaisha (JP)

( * ) Notice: Subject to any disclaimer, the term of this patent is extended or adjusted under 35 U.S.C. 154(b) by 0 days.

(21) Appl. No.: 09/699,310

(22) Filed: Oct. 26, 2000

(30) Foreign Application Priority Data

Oct. 26, 2000 (JP) .......................................... 11-304647

(51) Int. Cl.[7] ................................................. H02J 7/00
(52) U.S. Cl. ..................................... 320/104; 320/103
(58) Field of Search ................................ 320/104, 103, 320/125, 127, 123; 323/283, 284

(56) References Cited

U.S. PATENT DOCUMENTS

| | | | |
|---|---|---|---|
| 4,788,486 A | * 11/1988 | Mashino et al. | ............. 320/123 |
| 5,111,132 A | 5/1992 | Motose | ......................... 320/125 |
| 5,182,510 A | 1/1993 | Nakamura | .................... 322/21 |
| 5,233,282 A | 8/1993 | Iwashita | ...................... 320/117 |
| 5,234,363 A | 8/1993 | Motose | ......................... 440/77 |
| 5,418,401 A | * 5/1995 | Kaneyuki | ..................... 307/120 |
| 5,685,802 A | 11/1997 | Kanno | .......................... 477/111 |
| 5,708,348 A | * 1/1998 | Frey et al. | ................... 320/145 |
| 5,977,652 A | * 11/1999 | Frey et al. | ...................... 307/64 |

* cited by examiner

Primary Examiner—Edward H. Tso
Assistant Examiner—Lawrence Luk
(74) Attorney, Agent, or Firm—Knobbe, Martens, Olson & Bear, LLP

(57) ABSTRACT

A charging system for a plurality of batteries is provided to better regulate the charging process of the batteries, particularly in the case where one of the batteries is being charged by multiple generators. In one mode, the charging system inhibits overcharging of the batteries. In a further variation, the charging system seeks to maintain the voltages of the batteries within a predetermined charge range (i.e., between an undercharged value and a fully charged value).

25 Claims, 7 Drawing Sheets

CHARGING SYSTEM FOR WATERCRAFT

The present application is based upon and claims priority to Japanese Application No. 11-304647, filed Oct. 26, 1999.

BACKGROUND OF THE INVENTION

1. Field of the Invention

The invention relates to a charging system for a small boat and more particularly to a charging system for a small boat employing a plurality of motors.

2. Description of the Related Art

Marine drives often employ an internal combustion engine to power a propulsion unit of the drive system. It is well known that internal combustion engines rely heavily on electric components, including fuel injector solenoids, ignition system, control system and the like. To power these engine components, most engines include an engine driven generator (e.g., an alternator) to produce electricity. The generator is utilized to charge a storage battery, and the battery in turn powers the electrical components. This approach provides a stable supply of voltage to the electrical components.

In some boats, the generator also charges a second battery that powers various accessories on the boat (e.g., lights, gauges, etc.). A typical arrangement of this charging system is illustrated in FIGS. 1 and 2.

FIG. 1 is a perspective view of a boat 10 that employs a pair of outboard motors 12, 14 mounted on the transom of the boat. A motor battery 16, 18 is associated with each outboard motor 12, 14 and is connected to a starter motor 20, 22 of the outboard motor 12, 14. Each alternator 24, 26 charges the corresponding motor battery 16, 18, and the alternator 24 of the port side motor 12 also charges an accessory battery 28. The accessory battery powers various accessories of the boat, such as lights 29, gauges 27, radios, navigational equipment and the like.

FIG. 2 is a circuit diagram of a conventional charging system for the boat shown in FIG. 1. The three-phase alternator 24 of the port side outboard motor 12 (the "left engine") is connected to one terminal of the motor battery 16 through a first three-phase rectifier, and is connected to one terminal of the accessory battery 28 through a second three-phase rectifier. The first rectifier is formed by a first set of diodes 30 and a second set of diodes 32. The second rectifier is formed by a third set of diodes 34 and the second set of diodes 32. The anodes of the second set of diodes 32 are grounded as are the other terminals of the motor and accessory batteries 16, 28.

The alternator 24 is also connected to a regulator 36. The regulator 36 includes three thyristors. The gates of the thyristors are connected to a controller 38 having a microprocessor. The controller 38 sends trigger signals to the gates to control the firing of the thyristors. The input terminal a of the controller 38 is connected to the alternator 24 via another three-phase rectifier 40. When a voltage at the input terminal becomes higher than a desired voltage, for example, 15.5 volts, the controller 38 sends trigger signals to the thyristors, which, in turn, connect the output of the alternator 24 to the ground 42.

The alternator 26 of the starboard side outboard motor (the "right engine") is not connected to the accessory battery 28 and thus does not charge the accessory battery 28. For this reason, the charging circuitry associated with the right engine alternator 26 does not include a three-phase rectifier disposed between the alternator and the accessory battery, as the rectifier 34 does with in the charging circuitry associated with the left engine alternator 24. Except for these differences, the charging circuitry associated with the alternators 24, 26 are the same.

In some operating conditions, the left engine battery 16 is fully charged, but the accessory battery 28 and the right engine battery 18 are not. Prior charging systems cannot take advantage of continuing charging of the right engine battery 18 by the right engine alternator 26 to charge the accessory battery. In other situations, where only the right engine is running, the accessory battery will not be charged.

SUMMARY OF THE INVENTION

The present charging system allows for at least one battery of a vehicle's (e.g., a watercraft's) electrical system to be powered by multiple generators without the risk of overcharging that battery or any other batteries that are simultaneously charged by the generators. It is understood, however, that various aspect and features of the present charging system can also be employed in the situation where only one generator charges two or more batteries. The following summarizes some of the aspects and features of the present charging system and its method of operation.

One aspect of the invention involves a charging system for a watercraft having at least one marine drive that includes an engine. The charging system charges at least first and second batteries. The first battery is associated with the marine drive and the second battery is arranged to power accessories on the watercraft. A power generator of the charging system is driven by the engine and selectively charges the first and second batteries. A regulator is coupled to the generator to regulate the voltage supplied to the first and second batteries. The charging system also includes at least one controller that is connected to the first battery to determine a voltage at the first battery, to the second battery to determine a voltage at the second battery, and to the regulator for controlling the regulator. The controller is configured to compare the determined voltages of the first and second batteries with a predetermined overcharged voltage and to regulate the voltage supplied by the generator when the voltage at one of the first and second batteries is greater than the overcharged voltage.

In one preferred mode, the controller is further configured to compare the determined voltages of the first and second batteries with a predetermined fully charged voltage. The controller operates the regulator so as not to regulate the voltage supplied by the generator when the voltage at one of the first and second batteries is less than the fully charged voltage, even though the voltage at the other battery is greater than the fully charged voltage (but less than the overcharged voltage).

Another aspect of the invention involves a charging system for a watercraft having at least one marine drive that includes an engine. The charging system charges at least first and second batteries. The first battery is associated with the marine drive and the second battery is arranged to power accessories on the watercraft. A power generator of the charging system is driven by the engine and selectively charges the first and second batteries. A regulator is coupled to the generator to regulate the voltage supplied to the first and second batteries. The charging system also includes at least one controller that is connected to the first battery to determine a voltage at the first battery, to the second battery to determine a voltage at the second battery, and to the regulator for controlling the regulator. The controller is configured to compare the determined voltages of the first and second batteries with a predetermined fully charged voltage. The controller operates the regulator so as not to regulate the voltage supplied by the generator when the voltage at one of the first and second batteries is less than the fully charged voltage.

In a preferred mode, the controller is further configured to compare the determined voltages of the first and second batteries with a predetermined undercharged voltage. The controller operates the regulator so as to regulate the voltage supplied by the generator when the voltage at one of the batteries is greater than the fully charged voltage and one of the voltage at the other battery is greater than the undercharged voltage.

In a further preferred mode, the controller compares the determined voltages of the first and second batteries with a predetermined overcharged voltage. If the voltage at one of the batteries is greater than the overcharged voltage, the controller regulates the voltage supplied by the generator even though the voltage at the other battery is not greater than the undercharged voltage.

In a preferred form, the regulator, in the modes of the charging system summarized above, is configured generally to suspend the supply of electrical power to each battery.

In accordance with another aspect of the present invention, a watercraft includes a charging system and at least one marine drive that includes an engine. The charging system charges at least first and second batteries of the watercraft. The first battery is associated with the marine drive and the second battery is arranged to power accessories on the watercraft. A power generator of the charging system is driven by the engine and selectively charges the first and second batteries. A regulator is coupled to the generator to regulate the voltage supplied to the first and second batteries. The charging system also includes at least one controller that is connected to the first battery to determine a voltage at the first battery, to the second battery to determine a voltage at the second battery, and to the regulator for controlling the regulator. The controller is configured to compare the determined voltages of the first and second batteries with a predetermined fully charged voltage, with an overcharged voltage and with an undercharged voltage. The controller is configured to operate the regulator so as to suspend power supply from the alternator to the batteries (1) when the voltages at both batteries are greater than the undercharged voltage and the voltage of at least one of the batteries is greater than the fully charged voltage, or (2) when the voltage of at least one of the batteries is not greater than the undercharged voltage and the voltage of the other battery is greater than the overcharged voltage. The controller also is configured to operate the regulator so as not to regulate and permit power to be supplied from the alternator to the batteries (1) when the voltages of both batteries are lower than the fully charged voltage, or (2) when the voltage at one of the batteries is between the fully charged voltage and the overcharged voltage and the voltage of the other battery is not greater than the undercharged voltage.

Yet another aspect of the invention involves a method of charging batteries of a charging device for a watercraft having at least one marine drive, wherein the batteries comprise a first battery associated with the motor and a second battery associated with accessories on the watercraft. The method comprises determining whether the voltages are higher than the fully charged voltage, and whether at least one of the voltages at the first battery and the second battery becomes higher than the overcharged voltage; if so, allowing the controller to operate the regulator so that supplying electric power to each of the batteries from the generator can be suspended; detecting voltages at the first battery and the second battery to decide whether at least one of the voltages at the first battery and the second battery becomes lower than the fully charged voltage, and whether both of the voltages at the first battery and the second battery become lower than the overcharged voltage; if so, allowing the controller to output a signal to suspend the regulator so that electric power to each of the batteries from the generator can be supplied.

Another aspect of the invention involves a method for charging batteries of a watercraft. At least one of the batteries is associated with an engine of the watercraft and the at least another battery is associated with at least one accessory on the watercraft. The batteries are charged by at least one power generator driven by the engine. The method involves determining the voltage at each of the batteries and comparing the voltage at each of the batteries with a predetermined overcharged voltage. If one of the voltages at the batteries is greater than the overcharged voltage, then the voltage supplied by the generator to the batteries is regulated.

In accordance with an additional aspect of the invention, a method for charging batteries of a watercraft involves determining the voltage at each of the batteries and comparing the voltage at each of the batteries with a predetermined fully charged voltage. The voltage at each of the batteries also is compared with a predetermined undercharged voltage. If the voltage at one of the batteries is greater than the fully charged voltage and the voltage at the other battery is not less than the undercharged voltage, then the voltage supplied by the generator to the batteries is regulated. If both of the voltages at the batteries are not greater than the fully charged voltage, then the voltage supplied by the generator is not regulated.

Further aspects, features and advantages of this invention will become apparent from the detailed description of the preferred embodiment which follows.

BRIEF DESCRIPTION OF THE DRAWINGS

As noted above.

The present invention will now be described with reference to the drawings of preferred embodiments. The embodiments, however, are intended only to illustrate and not to limit the present invention. The drawings contain the following figures.

Figure 1:
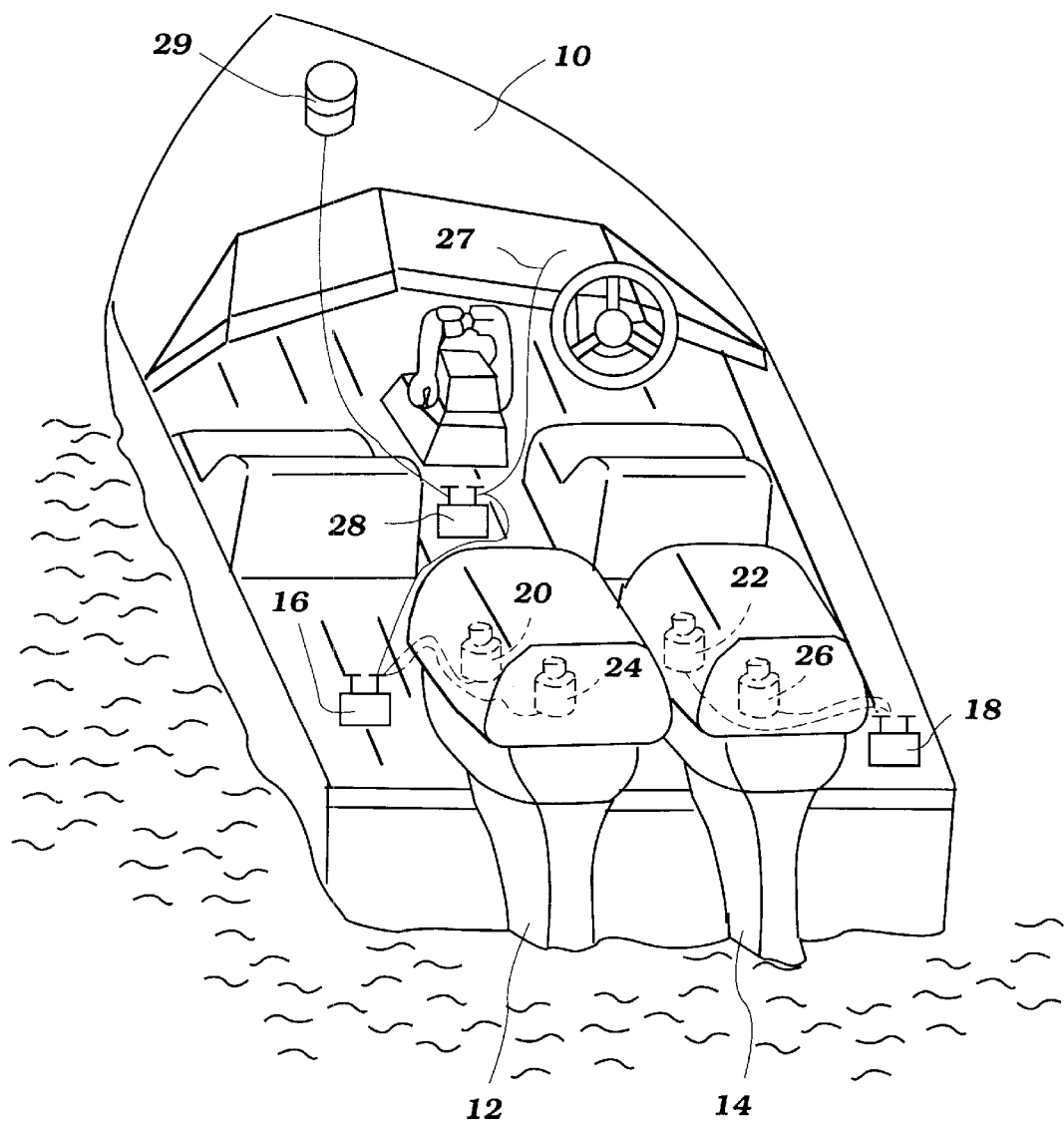
FIG. 1 illustrates a watercraft that employs a pair of outboard motors.
Figure 2:
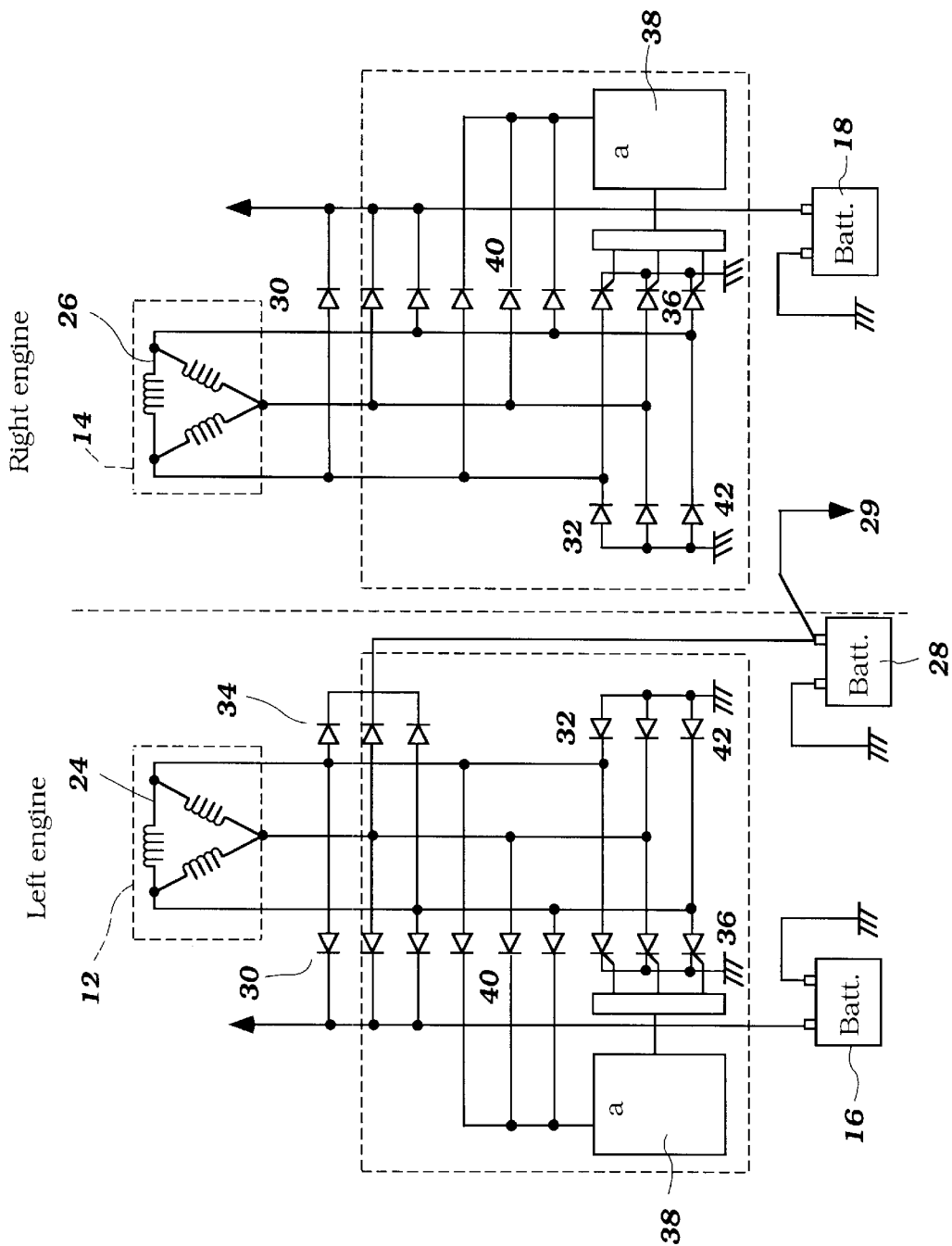
FIG. 2 illustrates a prior charging system for the batteries associated with the outboard motors and for a battery that powers various accessories on the watercraft.
Figure 3:
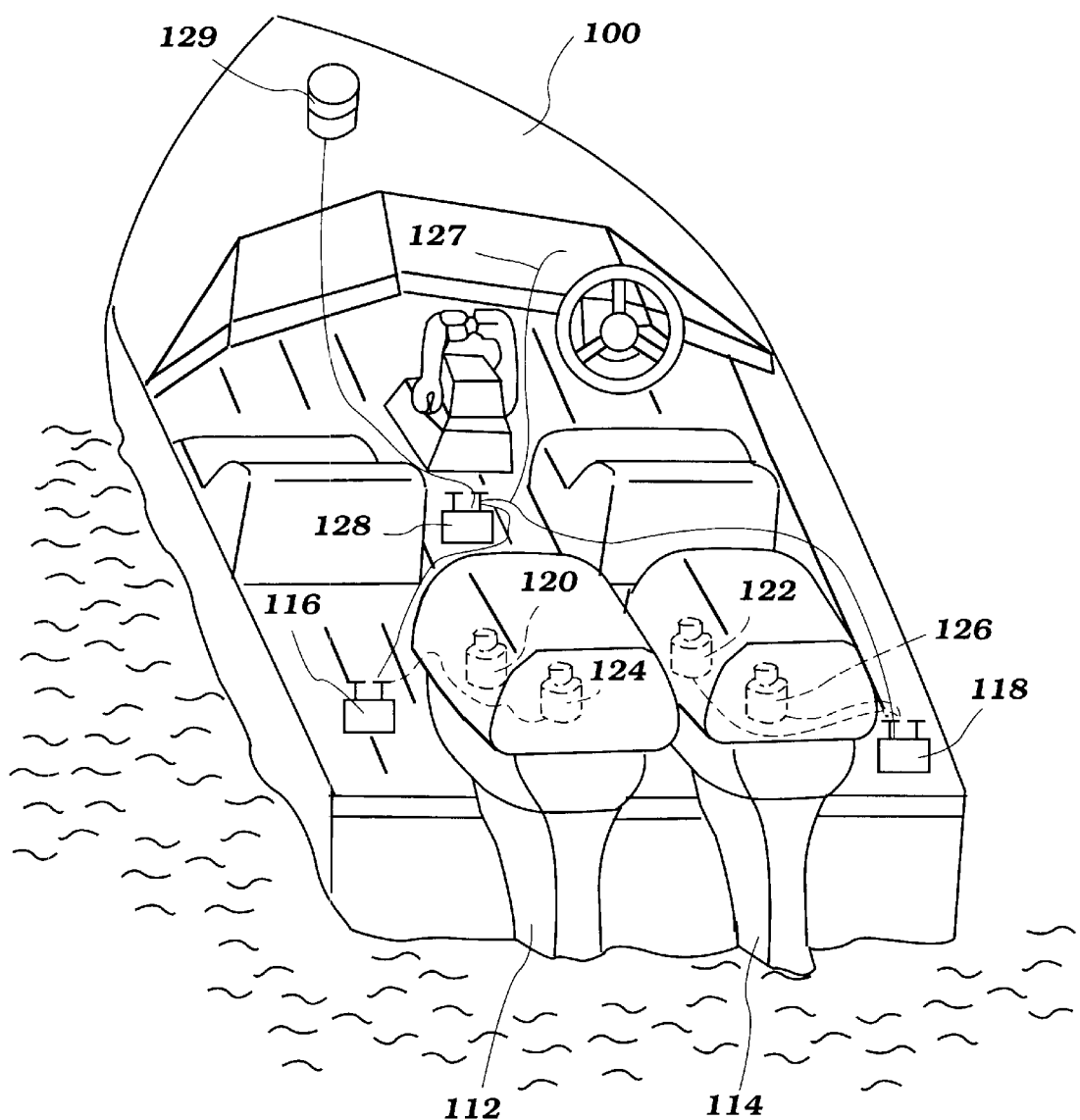

FIG. 3 is a rear perspective view of a boat in which a preferred embodiment of the present charging system is employed.

Figure 4:
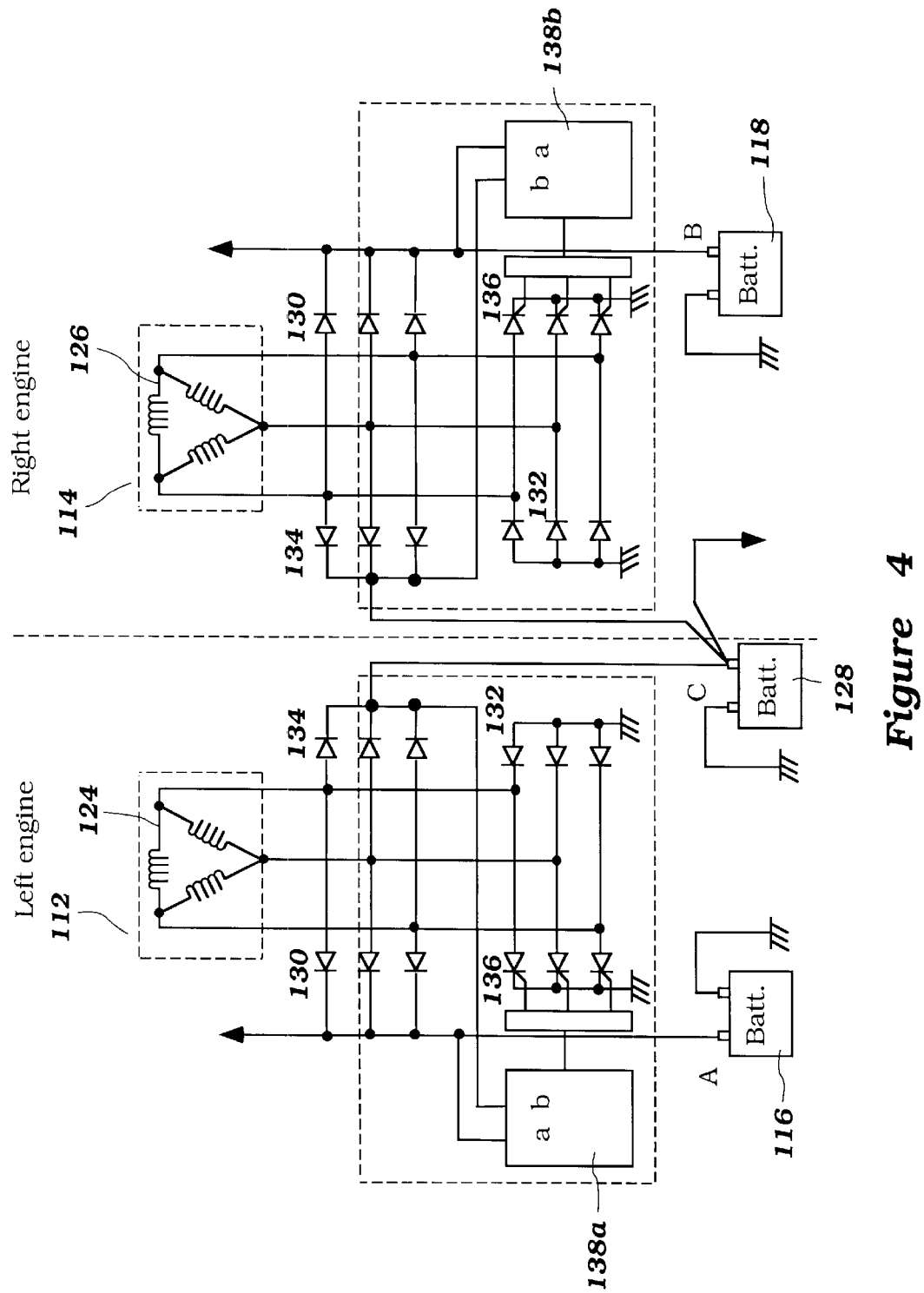

FIG. 4 is a circuit diagram of the charging system of FIG. 3.

Figure 5:
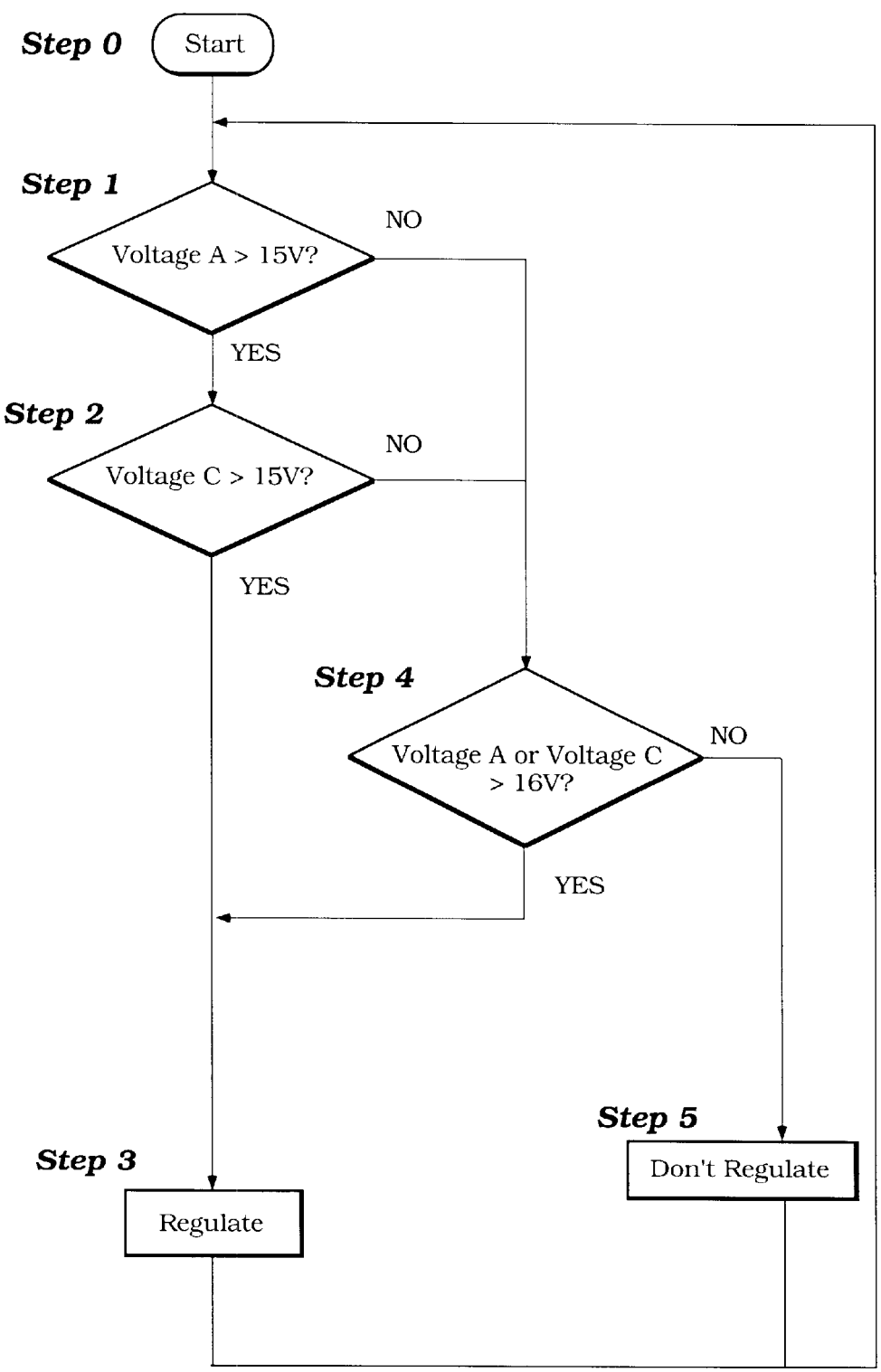

FIG. 5 is a flowchart illustrating a control routine for charging batteries of a charging system in accordance with one mode of practicing the invention.

Figure 6:
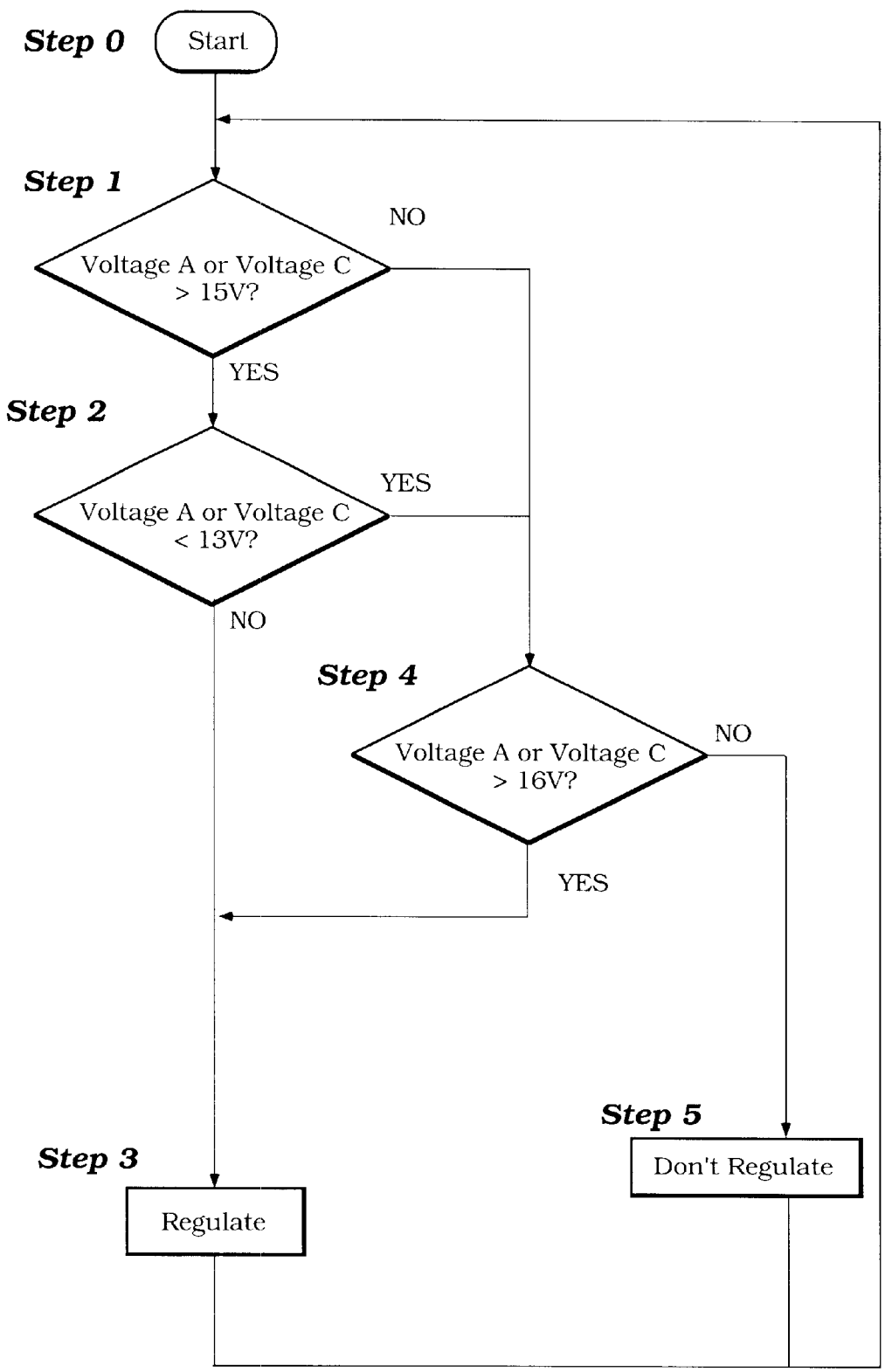

FIG. 6 is a flowchart illustrating another control routine for charging batteries of a charging device in accordance with another mode of practicing the invention.

Figure 7:
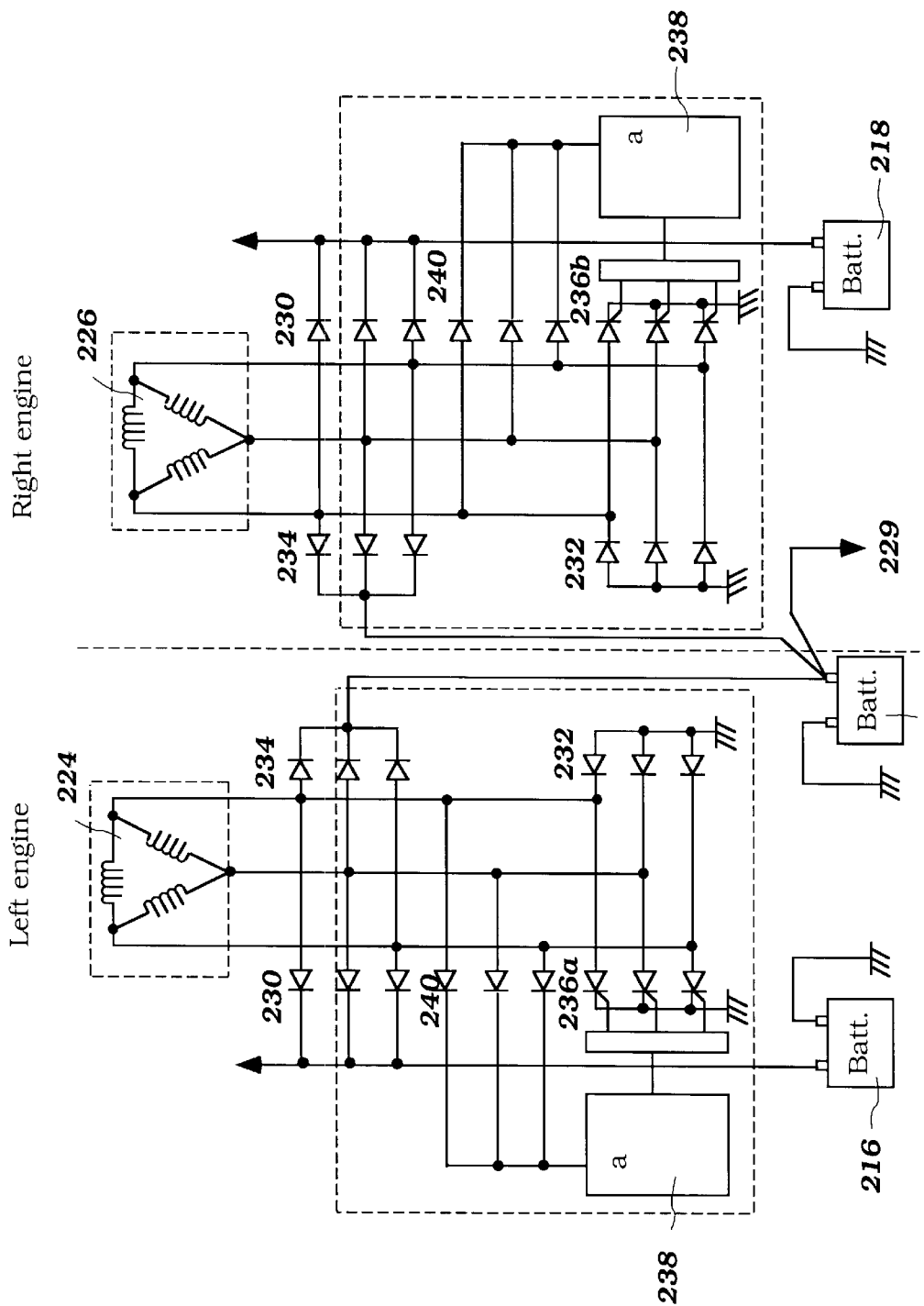

FIG. 7 is another circuit diagram of a charging device for a boat.

DETAILED DESCRIPTION OF THE PREFERRED EMBODIMENTS

With reference initially to FIG. 3, the present charging system is illustrated in connection with a watercraft 100 that is powered by a pair of outboard motors 112, 114. While the present charging system has particular utility in this environment of use, it is understood that various aspect, features and advantages of the present invention can be practiced in other applications, such as with other types of vehicles that include at least one power generator which charges at least two batteries.

The present charging system thus can be employed on a variety of boats, including yachts and fishing boats, personal watercraft and the like, and with a variety of types of propulsion systems such as, for example, but without limitation, outboard motors, inboard/outboard motors and inboard motor. The engines of these motors of any type, such as, for example, but without limitation, a four-cycle engine, two-cycle engine, diesel engine, gasoline engine, or rotary engine. The number the cylinder and arrangement of the cylinders may be single-cylinder, multi-cylinder, L-type, or V-type. The watercraft on which the charging system is employed also can include one or more propulsion systems, e.g., two or three outboard motors.

In the illustrated application, the charging system includes a pair of generators 124 126, e.g., three-phase alternators in the illustrated embodiment. An internal combustion engine of one outboard motor 112, 114 drives each alternator 124, 126. The alternators 124, 126 in turn selectively charge an accessory battery 128 and respective engine batteries 116. 118. That is, each alternator 124, 126 is connected to an engine battery 116, 118 and to the accessory battery 128. While the accessory battery 128 may be connected to a plurality of alternators, it need not be connected to all of the alternators. But it can be connected to all.

Each engine battery 116, 118 also can power at least a starter motor 120, 122, respectively, and various other electrical components of the corresponding engine. It is understood, however, that the present charging system can be used with manually started engines that do not include a starter motor. The accessory battery 128 powers various electrical components on the watercraft 100, such as, for example, but without limitation, lights 129, gauges 127, radios, navigational equipment and the like.

As seen in FIG. 4, the charging system includes one or more controllers 138 that control charging of the batteries. In the illustrated embodiment, one controller 138a, 138b is associated with each alternator 116, 118. A controller, however, need no be provided for each alternator.

Each controller 138 preferably is configured to collect and/or store voltage data from the batteries and to compare the determined voltages with predetermined control voltage levels. In one mode, the controller can include a dedicated processor and a memory for storing the control steps, which are implemented within a software module(s) (program(s) or routine(s)) executed by the processor and stored on or within any suitable readable medium (e.g., ROM or RAM). The processor further can be part of a general purpose computer with the control routine(s) stored on or within any suitable computer-readable medium. For use with such digital processors, the controller also includes a plurality of input ports that communicate with the processor via an analog-to-digital converter.

It should be understood that the various control steps may alternatively be implemented in-whole or in-part within specially designed hardware. For instance, the input ports of the controller can communicate with the input side of analog comparitors to compare the voltages with predetermine control voltage levels, in accordance with the control routines described below.

The circuit structure of the charging system, which is disposed between the first alternator 124, the first controller 138a and the first engine battery 116, is identical to the circuit structure disposed between the second alternator 126, the second controller 138b and the second engine battery 118. Accordingly, the following description of the circuit structure associated with the first alternator, controller and battery is understood to apply equally to the corresponding circuit structure associated with the second alternator, controller and battery, unless indicated otherwise.

The first alternator 124, which is associated with the port side outboard motor 112, is connected to one terminal of the engine battery 116 through a first three-phase rectifier, and is connected to one terminal of the accessory battery 128 through a second three-phase rectifier. The first rectifier is formed by a first set of diodes 130 and a second set of diodes 132. The second rectifier is formed by a third set of diodes 134 and the second set of diodes 132. The anodes of the second set of diodes 132 are grounded as are the other terminals of the motor and accessory batteries 116, 128.

The alternator 124 is also connected to a regulator 136 that prevents overcharging of the engine and accessory batteries 116, 128, and that in at least one mode seeks to maintain the battery voltages within a desired range. The regulator 136 includes three thyristors. The gates of the thyristors are connected to the controlled 138. The controller 138 sends trigger signals to the gates to control the firing of the thyristors.

The controller 138 includes at least two input ports that communicate with the terminals of the engine and accessory batteries 116, 128. The input terminal is connected to the output of the three-phase rectifier operating between the alternator and the engine battery terminal. The input terminal is conected to the output of the other three-phase rectifier that operates between the alternator and the accessory battery terminal.

In the illustrated embodiment, the controller 138 preferably has stored in its memory at least an overcharged voltage (for example, 16V), a fully charged voltage (for example, 15V), and an undercharged voltage (for example, 13V). The overcharged voltage is greater than the fully charged voltage, and the fully charged voltage is greater than the undercharged voltage.

FIG. 5 is a flowchart illustrating a first control routine for charging batteries of a charging device in accordance with one embodiment of the invention. The flow chart diagrams the charging process for the engine battery 116, which is associated with the port side outboard motor 112, and the accessory battery 128. Since the charging process for the other engine battery 118 can be understood by replacing the voltage at the terminal A ("voltage A") with the voltage at the terminal B ("voltage B"), a further description of the charging process associated with the battery 118 of the starboard side motor 114 and the accessory battery 128 is not believed necessary for an understanding of the invention.

The controller 138a initially compares the fully charged voltage level (e.g., 15V) with the voltage A of the engine battery 116, as represented in Step 1. When the voltage A is higher than the fully charged voltage, the control routine proceeds to Step 2; however, when the voltage A is lower than the fully charged voltage, the control routine proceeds to Step 4. At Step 2, the controller 138a compares the voltage at the terminal C of the accessory battery 128 ("voltage C") with the fully charged voltage level (e.g., 15V). When the voltage C is greater than the fully charged voltage, the control routine proceeds to Step 3; on the other hand, when it is lower, the control routine proceeds to Step 4.

At Step 3, the controller 138a outputs a trigger signal to the regulator 136 to begin or continue regulation, and then returns to Step 1. At Step 4, the controller compares voltage A and voltage C with the predetermined overcharged voltage level (e.g., 16V). When at least one of voltage A and voltage C is greater than the overcharged voltage (e.g., greater than 16V), the control routine moves to Step 3 to begin or continue regulation, and then returns to Step 1. However, when both voltage A and voltage C are lower than the overcharged voltage, the control routine proceeds to Step 5. At Step 5, the controller 138a does not output or stops outputting a trigger signal so as not to regulate the voltage supplied by the alternator. Then the control routine then returns to Step 1.

In this embodiment, when both of the voltages A and C are higher than the fully charged voltage (e.g., 15 V), and when at least one of the voltages A and C is higher than the overcharged voltage (e.g., 16 V), regulation begins to suspend supplying electric power from the alternator to each of the batteries. When at least one of the voltages A and C is lower than the fully charged voltage (e.g., 15 V), and when both of the voltages A and C are lower than the overcharged voltage (e.g., 16 V), regulation finishes or is not done so as to supply electric power from the alternator to each of the batteries.

In the left and right engines, the voltage at the engine battery and the voltage at the other engine battery are charged to be identical to the voltage of the accessory battery. When the voltages and are in excess of the fully charged voltage (e.g., 15 V), regulation starts or continues. Because of this control, even when all of the batteries are fully charged, the control routine prevents overcharging any one of the batteries. The voltages of the batteries when they are approximately at the fully charged voltage (e.g., 15 V) never reach the overcharged voltage (e.g., 16 V). Thus, even when two of the batteries are fully charged, the other battery can be smoothly charged.

In addition, even when one of the batteries has deteriorated, the other batteries are not overcharged. Since the commencement and termination of regulation is controlled based on the overcharged voltage (e.g., 16 V), overcharging the batteries is inhibited.

FIG. 6 is a flowchart illustrating another control routine for charging batteries of a charging system in accordance with another embodiment of the invention. The flow chart explains charging process for the left motor 112. Since the charging process for the right motor 114 is understood by replacing the voltage at the terminal A ("voltage A") with the voltage at the terminal B ("voltage B"), a further description of the charging process associated with the battery of the starboard side motor and the accessory battery is not believed necessary for an understanding of the invention.

In FIG. 6, at Step 0, the routine starts. At Step 1, the controller 138a compares the voltage A at the engine battery 116 and the voltage C at the accessory battery 128 with the fully charged voltage (e.g., 15 V). When at least one of the voltages A and C is higher than the fully charged voltage (e.g., greater than 15 V), the process proceeds to Step 2. If, on the other hand, both of the voltages A and C are lower than the fully charged voltage (e.g., less than 15 V), the process proceeds to Step 5.

At Step 2, the controller 138a compares the voltage A at the engine battery and the voltage C at the accessory battery with the undercharged voltage (e.g., 13 V). When one of the voltages A and C is lower than the undercharged voltage (e.g., less than 13 V), the routine proceeds to Step 4. If, however, both of the voltages A and C are higher than the undercharged voltage (e.g., greater than 13 V), the routine proceeds to Step 3. At Step 3, the controller 138a sends a trigger signal to the regulator 136 to begin or continue regulation. Then, the routine returns to Step 1.

At Step 4, the controller 138a compares the voltage at the engine battery 116 and the voltage at the accessory battery 128 with the overcharged voltage (e.g., 16 V). When one of the voltages is higher than the overcharged voltage (e.g., greater than 16 V), the process proceeds to Step 3 to commence or continue regulation and then return to Step 1. If both of the voltages and are lower than the overcharged voltage (e.g., less than 16 V), the process proceeds to Step 5, where the controller stops outputting or does not output a trigger signal to the regulator 136 to terminate or not initiate regulation. The process then returns to Step 1.

In the embodiment, when at least one of the voltages A and C is higher than the fully charged voltage (e.g., 15 V), when both of the voltages A and C are higher than the undercharged voltage (e.g., 13 V), and when at least one of the voltages A and C is higher than the overcharged voltage (e.g., 16 V), regulation works to terminate supplying electric power to each of the batteries from the alternator.

In the meantime, when both of the voltages A and C are lower than the fully charged voltage (e.g., 15 V), and when one of the voltages A and C is between the fully charged voltage (e.g., 15 V) and the overcharged voltage (e.g., 16 V) and the other is lower than the undercharged voltage (e.g., 13 V), regulation is stopped or not started to supply electric power to each of the batteries from the alternator.

Even when the batteries are fully charged, the voltages A and B at the engine batteries and the voltage C at the accessory battery are between the fully charged voltage (e.g., 15 V) and the overcharged voltage (e.g., 16 V). The voltages A, B, and C are inhibited from exceeding the overcharged voltage (e.g., 16 V). Accordingly, even if the engine battery of the starboard motor and the accessory battery are fully charged, the engine battery of the left motor can be charged smoothly.

In the embodiment, one controller for each outboard motor is provided. The controller inputs the voltage A and B of the engine batteries and the voltage C of the accessory battery, and controls the regulator. Even when the watercraft includes only outboard motor, the same controller can be used as is. Thus, whether the watercraft includes one alternator or a plurality of alternators, the same type of charging system can be employed, which reduces the cost. In addition, more than two alternator may be connected to the accessory battery to ensure that it is adequately charged under all running conditions.

The regulator of the invention is controlled by comparing the engine battery and the accessory battery with the fully charged voltage. Accordingly, even if the accessory battery is charged sufficiently, the engine battery cannot be charged smoothly when the engine battery is charged insufficiently. If either one of the engine battery and the accessory battery is deteriorated, the other may be overcharged. However, since the present invention compares the engine battery and the accessory battery with the overcharged voltage, overcharging the batteries can be inhibited.

One advantage of the present charging system can be understood from a comparison with another contemplated approach, which is illustrated in FIG. 7. FIG. 7 is a circuit diagram of a charging device for a watercraft, such as that illustrated in FIG. 3. In the circuit diagram, the structures of the left engine and the right engine are identical. The alternator 226 of the right engine can charge the accessory battery in addition to the alternator 224 of the left engine. However, since each regulator 236 may vary and have tolerance errors, due to variations in parts and manufacture, the regulator 236a on the left engine and a regulator 236b on the right engine can have a different operating voltages. For example, there may be a case where an operating voltage at the left engine regulator 236a is 15.4 volts (V) and at the right engine regulator 236b is 15.5 volts.

When the engine battery 218 of the right engine and the accessory battery 228 are fully charged to 15.5 V, the engine battery 216 of the left engine may be undercharged. Under the situation, the alternator 224 on the left engine works to raise an output voltage of the alternator, which, in turn, charges the engine battery 216. Since a small current flows from the accessory battery 228 to the alternator 224 via the diode set 232, the output voltage of the alternator rises to 15.5 V in excess of the operating voltage of 15.4 V. Under this circumstance, the regulator 236b operates and thereby reduces the output voltage of the alternator 224. As a result, the engine battery 216 cannot be smoothly charged. The embodiment of the charging system described above solves this problem.

For purposes of summarizing the invention and the advantages achieved over the prior art and other contemplated approaches, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. Moreover, many of the steps of the routines described above can be performed in various orders, as will be well understood by one skilled in the art from the above description, while still carrying out one or more objects or advantages of the present invention. For example, it is understood that in the routine diagramed by FIG. 6, Step 4 can be performed before Step 1. Thus, it is intended that the scope of the present invention herein disclosed should not be limited by the particular disclosed embodiments described above, but should be determined only by a fair reading of the claims that follow.

What is claimed is:

1. A watercraft comprising a marine drive including at least one engine and a charging system that charges at least first and second batteries, the first battery being associated with the marine drive and the second battery being arranged to power at least one accessory on the watercraft, the charging system comprising a power generator that is driven by the engine and is arranged so as to selectively charge the first and second batteries, a regulator being coupled to the generator to regulate the voltage supplied to the first and second batteries, and at least one controller that is connected to the first battery to determine a voltage at the first battery, to the second battery to determine a voltage at the second battery, and to the regulator for controlling the regulator, the controller being configured to compare the determined voltages of the first and second batteries with a predetermined overcharged voltage and to regulate the voltage supplied by the generator when the voltage at one of the first and second batteries is greater than the overcharged voltage.

2. A watercraft as in claim 1, wherein the controller is further configured to compare the determined voltages of the first and second batteries with a predetermined fully charged voltage, and to operate the regulator so as not to regulate the voltage supplied by the generator when neither voltage at the first and second batteries is greater than the overcharged voltage and the voltage at at least one of the first and second batteries is less than the fully charged voltage, regardless of whether the voltage at the other battery is greater than the fully charged voltage.

3. A watercraft as in claim 1, wherein the controller is further configured to compare the determined voltages of the first and second batteries with a predetermined undercharged voltage, and to operate the regulator so as not to regulate the voltage supplied by the generator when the voltage of at least one of the first and second batteries is less that the undercharged voltage and the voltage of the other battery is not greater than the overcharged voltage.

4. A watercraft as in claim 3, wherein the controller is further configured to operate the regulator so as to regulate the voltage supplied by the generator when the voltage of at least one of the first and second batteries is less than the undercharged voltage and the voltage of the other battery is greater than the overcharged voltage.

5. A watercraft as in claim 1, wherein the generator is an alternator, and the charging system additionally includes a plurality of rectifiers, one rectifier operating between the alternator and the first battery and another rectifier operating between the alternator and the second battery.

6. A watercraft as in claim 5, wherein a voltage output from said one rectifier is solely connected to the first battery and an voltage output from said another rectifier is solely connected to the second battery.

7. A watercraft as in claim 1 additionally comprising at least another engine that drives a second generator, and at least the second battery is connected to both generators.

8. A watercraft as in claim 7, wherein the charging system includes at least a second controller configured to regulate power supplied from the second generator to the second battery.

9. A watercraft as in claim 8 additionally comprising a third battery that is connected to and is selectively powered by the second generator, and the second controller further being configured to regulate power supplied by the second generator to the third battery.

10. A charging device for a watercraft having at least one motor, at least one alternator driven by the motor, at least one motor battery and at least one accessory battery, the alternator being connected to the motor battery through a first rectifier and to the accessory battery through a second rectifier, the charging device comprising:

a regulator connected to the alternator to regulate the voltage output of the alternator; and at least one controller connected to the motor battery to determine a voltage at the motor battery, to the accessory battery to determine a voltage at the accessory battery, and to the regulator for controlling the regulator, the controller storing a predetermined fully charged voltage, a predetermined overcharged voltage, and a predetermined undercharged voltage;

wherein the controller is configured to output a signal to the regulator to regulate the supply of power from the alternator to the batteries when at least one of the voltages at the motor battery and the accessory battery is higher than the fully charged voltage and both of the voltages at the motor battery and the accessory battery are higher than the undercharged voltage, and when at least one of the voltages at the motor battery and the accessory battery is higher than the overcharged voltage; and wherein the controller is configured to output a signal to the regulator to not regulate the supply of power from the alternator to the batteries when both of the voltages at the motor battery and the accessory battery are lower than the fully charged voltage, and when one of the voltages at the motor battery and the accessory battery is between the fully charged voltage and the overcharged voltage and the other voltage is lower than the undercharged voltage.

11. A watercraft comprising a marine drive including at least one engine and a charging system that charges at least first and second batteries, the first battery being associated with the marine drive and the second battery being arranged to power at least one accessory on the watercraft, the charging system comprising a power generator that is driven by the engine and is arranged so as to selectively charge the first and second batteries, a regulator being coupled to the generator to regulate the voltage supplied to the first and second batteries, and at least one controller that is connected to the first battery to determine a voltage at the first battery, to the second battery to determine a voltage at the second battery, and to the regulator for controlling the regulator, the controller being configured to compare the determined voltages of the first and second batteries with a predetermined fully charged voltage and to operate the regulator so as not to regulate the voltage supplied by the generator when the voltage at one of the first and second batteries is less than the fully charged voltage.

12. A watercraft as in claim 11, wherein the controller is further configured to compare the determined voltages of the first and second batteries with a predetermined undercharged voltage and to operate the regulator so as to regulate the voltage supplied by the generator when the voltage at one of the batteries is greater than the fully charged voltage and one of the voltage at the other battery is greater than the undercharged voltage.

13. A watercraft as in claim 12, wherein the controller is further configured to compare the determined voltages of the first and second batteries with a predetermined overcharged voltage, and to control the regulator to regulate the voltage supplied by the generator if the voltage at one of the batteries is greater than the overcharged voltage, even though the voltage at the other battery may not be greater than the undercharged voltage.

14. A watercraft as in claim 11, wherein the generator is an alternator, and the charging system additionally includes a plurality of rectifiers, one rectifier operating between the alternator and the first battery and another rectifier operating between the alternator and the second battery.

15. A watercraft as in claim 11 additionally comprising at least another engine that drives a second generator, and at least the second battery is connected to both generators.

16. A watercraft as in claim 15, wherein the charging system includes at least a second controller configured to regulate power supplied from the second generator to the second battery.

17. A watercraft as in claim 16 additionally comprising a third battery that is connected to and is selectively powered by the second generator, and the second controller further being configured to regulate power supplied by the second generator to the third battery.

18. A charging device for a watercraft having at least one motor, at least one alternator driven by the motor, at least one motor battery and at least one accessory battery, the alternator being connected to the motor battery through a first rectifier and to the accessory battery through a second rectifier, the charging device comprising:

a regulator connected to the alternator to regulate the voltage output of the alternator; and at least one controller connected to the motor battery to determine a voltage at the motor battery, to the accessory battery to determine a voltage at the accessory battery, and to the regulator for controlling the regulator, the controller storing a predetermined fully charged voltage and a predetermined overcharged voltage;

wherein the controller is configured to output a signal to the regulator to regulate the supply of power from the alternator to the batteries when both of the voltages at the motor battery and the accessory battery are higher than the fully charged voltage, and at least one of the voltages at the motor battery and the accessory battery is higher than the overcharged voltage; and wherein the controller is configured to output a signal to operate the regulator so as not to regulate the power from the alternator to the batteries when at least one of the voltages at the motor battery and the accessory battery is lower than the fully charged voltage and when both of the voltages at the motor battery and the accessory battery are lower than the overcharged voltage.

19. A control method for charging batteries of a watercraft, wherein at least one of the batteries is associated with an engine of the watercraft and the other battery is associated with at least one accessory on the watercraft, and the batteries are charged by a power generator driven by the engine, the method comprising:

determining the voltage at each of the batteries;

comparing the voltage at each of the batteries with a predetermined fully charged voltage and a predetermined overcharged voltage;

regulating the voltage supplied by the generator to the batteries if one of the voltages at the batteries is greater than the overcharged voltage; and not regulating the voltage supplied by the generator to the batteries if both of the voltages at the batteries are not greater than the fully charged voltage.

20. A control method as in claim 19 additionally comprising:

comparing the voltage at each of the batteries with a predetermined fully charged voltage;

regulating the voltage supplied by the generator to the batteries if both of the voltages at the batteries are greater than the fully charged voltage; and not regulating the voltage supplied by the generator to the batteries if both of the voltages at the batteries are not greater than the fully charged voltage.

21. A control method as in claim 19 additionally comprising:

comparing the voltage at each of the batteries with a predetermined undercharged voltage; and not regulating the voltage supplied by the generator to the batteries if the voltages at one of the batteries is less than the undercharged voltage and the voltage at the other battery is less than the overcharged voltage.

22. A control method as in claim 21 additionally comprising:
   comparing the voltage at each of the batteries with a predetermined fully charged voltage; and
   regulating the voltage supplied by the generator to the batteries if both of the voltages at the batteries are not less than the undercharged voltage and at least one of the voltages at the batteries is greater than the fully charged voltage.

23. A control method as in claim 22 additionally comprising not regulating the voltage supplied by the generator to the batteries if both voltages at the batteries are less than the fully charged voltage.

24. A control method for charging batteries of a watercraft, wherein at least one of the batteries is associated with an engine of the watercraft and the other battery is associated with at least one accessory on the watercraft, and the batteries are charged by a power generator driven by the engine, the method comprising:
   determining the voltage at each of the batteries;
   comparing the voltage at each of the batteries with a predetermined fully charged voltage;
   comparing the voltage at each of the batteries with a predetermined undercharged voltage;
   regulating the voltage supplied by the generator to the batteries if the voltage at one of the batteries is greater than the overcharged voltage and the voltage at the other battery is not less than the undercharged voltage; and
   not regulating the voltage supplied by the generator to the batteries if both of the voltages at the batteries are not greater than the fully charged voltage.

25. A control method as in claim 24 additionally comprising:
   comparing the voltage at each of the batteries with a predetermined overcharged voltage;
   regulating the voltage supplied by the generator to the batteries if at least one of the voltages at the batteries is greater than the overcharged voltage; and
   not regulating the voltage supplied by the generator to the batteries if the voltage at one of the batteries is less than the undercharged voltage and the voltage at the other battery is greater than the fully charged voltage but less than the overcharged voltage.

* * * * *